United States Patent
Zhu

(10) Patent No.: US 10,888,933 B2
(45) Date of Patent: Jan. 12, 2021

(54) TOOL BIT REPLACEABLE ROTARY CUTTING TOOL AND ROTARY CUTTING METHOD AND TOOL BIT MOUNTING METHOD THEREOF

(71) Applicant: ZHEJIANG XINXING TOOLS CO.,LTD., Jiaxing, Zhejiang (CN)

(72) Inventor: Dongwei Zhu, Zhejiang (CN)

(73) Assignee: Zhejiang Xinxing Tools Co., Ltd., Zhejiang (CN)

( * ) Notice: Subject to any disclaimer, the term of this patent is extended or adjusted under 35 U.S.C. 154(b) by 0 days.

(21) Appl. No.: 16/322,311

(22) PCT Filed: Dec. 28, 2017

(86) PCT No.: PCT/CN2017/119189
§ 371 (c)(1),
(2) Date: Jan. 31, 2019

(87) PCT Pub. No.: WO2019/047433
PCT Pub. Date: Mar. 14, 2019

(65) Prior Publication Data
US 2019/0283144 A1 Sep. 19, 2019

(30) Foreign Application Priority Data
Sep. 8, 2017 (CN) .......................... 2017 1 0804385

(51) Int. Cl.
*B23B 51/02* (2006.01)
*B23B 51/06* (2006.01)
*B23B 27/16* (2006.01)

(52) U.S. Cl.
CPC .......... *B23B 51/02* (2013.01); *B23B 27/1603* (2013.01); *B23B 51/06* (2013.01);
(Continued)

(58) Field of Classification Search
CPC .......... B23B 2251/043; B23B 2251/50; B23B 2260/124; B23B 27/1603; B23B 51/02; B23B 51/06
See application file for complete search history.

(56) References Cited

U.S. PATENT DOCUMENTS 4,744,704 A * 5/1988 Galvefors ............... B23B 51/02
408/144
5,733,076 A 3/1998 Basteck
(Continued)

FOREIGN PATENT DOCUMENTS

CN 202180242 U 4/2012
CN 102784952 A 11/2012
(Continued)

OTHER PUBLICATIONS

JP-2003291013-A Machine Translation, pp. 5-12 (Year: 2020).*

*Primary Examiner* — Nicole N Ramos
(74) *Attorney, Agent, or Firm* — Muncy, Geissler, Olds & Lowe, P.C.

(57) ABSTRACT

The present invention relates to a tool bit replaceable rotary cutting tool and a rotary cutting method and a tool bit mounting method thereof and belongs to the field of hole machining in the machining industry. At present, a twist drill for drilling is of an integrated structure, and when service life of a tool bit is exhausted, the whole drill is required to be replaced, so that cost is relatively high. For a tool bit replaceable drilling tool, in a drilling process, radial and axial acting forces on a tool bit are relatively strong and thus may cause the conditions of imprecise drilling caused by radial displacement of the tool bit at a joint and the like, a replaceable structure of the tool bit makes the joint of the tool bit of the drilling tool relatively weak and a design of a chip groove makes a substrate of the drilling tool weaker. According to the tool bit replaceable rotary cutting tool of (Continued)

the present invention, a tool bit is detachably connected with a tool bar, and V-shaped positioning surfaces are adopted for a joint of the tool bit and the tool bar, so that a good tool bit positioning and fixation effect is achieved, and the tool bit is unlikely to deviate; a design with different helical angles is adopted for a chip groove, so that strength of the tool bar is strengthened; due to design of cooling guide grooves, a cooling effect is improved; and the tool bit is easy to mount and dismount.

6 Claims, 10 Drawing Sheets

(52) U.S. Cl.
CPC ..... *B23B 2251/02* (2013.01); *B23B 2251/043* (2013.01); *B23B 2251/046* (2013.01); *B23B 2251/50* (2013.01); *B23B 2260/124* (2013.01)

(56) References Cited

U.S. PATENT DOCUMENTS

| | | | | |
|---|---|---|---|---|
| 5,782,589 | A * | 7/1998 | Cole | B23B 51/048 |
| | | | | 407/33 |
| 6,224,302 | B1 * | 5/2001 | Cole | B23B 51/0009 |
| | | | | 408/223 |
| 6,514,019 | B1 * | 2/2003 | Schulz | B23B 51/0009 |
| | | | | 408/227 |
| 2003/0185640 | A1 * | 10/2003 | Ito | B23B 51/02 |
| | | | | 408/230 |
| 2011/0097170 | A1 * | 4/2011 | Miller | B25B 27/18 |
| | | | | 408/226 |
| 2011/0110735 | A1 * | 5/2011 | Klettenheimer | B23B 51/02 |
| | | | | 408/57 |
| 2011/0236145 | A1 * | 9/2011 | Pabel | B23B 51/02 |
| | | | | 408/226 |
| 2012/0034043 | A1 * | 2/2012 | Krieg | B23B 51/02 |
| | | | | 408/230 |
| 2015/0258617 | A1 * | 9/2015 | Kiuchi | B23C 5/1036 |
| | | | | 407/42 |

FOREIGN PATENT DOCUMENTS

| | | | |
|---|---|---|---|
| CN | 104907613 | A | 9/2015 |
| CN | 104907614 | a | 9/2015 |
| CN | 204657564 | U | 9/2015 |
| CN | 206305515 | U | 7/2017 |
| CN | 207267068 | U | 4/2018 |
| JP | 2003291013 | A * | 10/2003 |
| JP | 2007331081 | A * | 12/2007 |

* cited by examiner

TOOL BIT REPLACEABLE ROTARY CUTTING TOOL AND ROTARY CUTTING METHOD AND TOOL BIT MOUNTING METHOD THEREOF

TECHNICAL FIELD

The present invention relates to a tool bit replaceable rotary cutting tool and a rotary cutting method and a tool bit mounting method thereof, and belongs to the field of hole machining in the machining industry.

BACKGROUND ART

At present, a twist drill for drilling, for example, Chinese Patent No. 201310750248.5, is of an integrated structure and the whole drilling tool is required to be replaced when service life of a tool bit is exhausted, so that cost is relatively high.

For a tool bit replaceable drilling tool, in a drilling process, radial and axial acting forces on a tool bit are relatively strong and thus may cause the conditions of imprecise drilling caused by radial displacement of the tool bit at a joint and the like. A replaceable structure of the tool bit makes the joint of the tool bit of the drilling tool relatively weak and a design of a chip groove makes a substrate of the drilling tool weaker. For example, a rotary drilling tool and a substrate for the rotary drilling bit are disclosed in Chinese Patent No. 201210152756.9. A tool bit of the drilling tool is replaceable. The tool bit and the substrate are fixed by inserting a protruding portion into a recess portion, and a connecting surface of the tool bit and the substrate is approximately horizontal. In a drilling process, a radial acting force is relatively strong and thus may cause the conditions of imprecise drilling caused by a position deviation of the tool bit, damage to a joint of the tool bit and the substrate and the like. In addition, for achieving a chip removal effect, the interior of a chip flute, for removing cutting chips, of the drilling bit is deep enough, which makes the whole drilling bit, particularly the joint of the tool bit and the substrate, weaker. A mouth portion for discharging a coolant at one end of the drilling tool is of a hole-shaped structure, so that the coolant is discharged in a columnar jetting manner, which causes nonuniform cooling.

SUMMARY OF THE INVENTION

The present invention is directed to provide a tool bit replaceable rotary cutting tool and a rotary cutting method and a tool bit mounting method thereof to overcome the foregoing shortcomings in the existing technology. A tool bit of the tool bit replaceable rotary cutting tool is detachably connected with a tool bar, and when service life of the tool bit is exhausted, only the tool bit is required to be replaced, and it is unnecessary to replace the whole cutting tool. V-shaped surface positioning is adopted at a joint of the tool bit and the tool bar, so that the tool bit is effectively positioned and fixed on the tool bar and is unlikely to deviate in a drilling process. A design with different helical angles is adopted for a chip groove, so that a chip removal effect is achieved, meanwhile, a depth of the chip groove is reduced, and strength of the tool bar is strengthened. Due to design of a cooling guide groove, a discharge direction of a coolant may be accurately controlled to achieve a uniform and complete cooling effect, and the condition that a cooling opening is blocked is avoided. The tool bit is easy to mount and dismount, and using cost is reduced.

For solving the foregoing problems, the present invention adopts the following technical scheme. A tool bit replaceable rotary cutting tool includes a tool bit and a tool bar, wherein the tool bit is detachably connected with the tool bar, the tool bit and the tool bar have the same axis, the tool bar is provided with a blade portion and a shank portion along the axis, and the blade portion is connected with the tool bit. The tool bit replaceable rotary cutting tool is characterized in that the tool bit includes a cutting edge, a chisel edge chip removal surface, a contact surface, a tool bit screw hole, a circumferential cutting margin, a convex V-shaped positioning surface and a central positioning cylinder, wherein the cutting edge and the chisel edge chip removal surface are arranged at the top of the tool bit, the contact surface and the circumferential cutting margin are arranged on the lateral surface of the tool bit along the axis, the tool bit screw hole is formed in the tool bit in a penetration manner and penetrates through the contact surface, and the convex V-shaped positioning surface and the central positioning cylinder are arranged at the bottom of the tool bit; the tool bar includes a chisel edge avoiding surface, a torque support surface, a screw hole, a concave V-shaped positioning surface, a central positioning hole, a cooling passage, cooling holes, two cooling guide grooves, a main chip groove and an auxiliary chip groove, the chisel edge avoiding surface is connected with the chisel edge chip removal surface, the chisel edge avoiding surface and the chisel edge chip removal surface are converged with the main chip groove and/or the auxiliary chip groove, the torque support surface contacts with the contact surface, the screw hole is formed in an end portion of the tool bar in the penetration manner and penetrates through the torque support surface, a screw penetrates through the screw hole and the tool bit screw hole to fix the tool bit to the tool bar, the concave V-shaped positioning surface forms positional correspondence with the convex V-shaped positioning surface, the central positioning hole forms positional correspondence with the central positioning cylinder, a protruding portion of the convex V-shaped positioning surface is positioned in a recess portion of the concave V-shaped positioning surface, the convex V-shaped positioning surface contacts with the concave V-shaped positioning surface, the central positioning cylinder is positioned in the central positioning hole, and a depth of the central positioning hole is larger than an axial length of the central positioning cylinder; the tool bar is provided with at least one main chip groove and one auxiliary chip groove along the axis, an internal helical angle of the main chip groove includes a first helical angle and a second helical angle, an angle of the first helical angle is different from an angle of the second helical angle, and the main chip groove extends to the cutting edge of the tool bit; and the cooling passage for delivering a coolant during drilling is formed in the tool bar, two cooling guide grooves distributed along a direction of the axis are formed in an outer wall surface of the end portion of the tool bar, and a cooling hole is formed in one inner end of each cooling guide groove. With adoption of a V-shaped surface positioning design, an axial stress in a drilling process is medium and thus the tool bar is unlikely to damage. With adoption of a cylinder positioning design, the central positioning hole can effectively prevent radial displacement of the tool bit to ensure stable, safe and reliable machining during high-speed drilling when a radial acting force is relatively strong in a drilling process. A design with different helical angles is adopted for the interior of the main chip groove, so that a chip removal effect is achieved, meanwhile, a depth of the chip groove is reduced, strength of the tool bar can be effectively strengthened, torsional deformation in the drilling process is reduced, and the problems of tool bit cracking, poor drilling roughness, poor drilling accuracy and the like caused by deformation of the tool bar are solved. Due to design of the auxiliary chip groove, chips can be removed more smoothly, and deformation of the cutting chips is reduced to obtain optimally shaped cutting chips. Due to design of the two cooling guide grooves in the end portion of the tool bar, a discharge direction of the coolant can be accurately controlled, flow reduction may be avoided even though the cutting chips are drilled in, a uniform and complete cooling effect is achieved, the condition that a cooling opening is blocked is avoided, and pressure of the coolant is kept constant.

Further, a bottom included angle of the concave V-shaped positioning surface is 90° to 140°, and the convex V-shaped positioning surface is embedded therein for full contact with it, so that the axial stress in the drilling process is medium.

Further, the tool bit is fixed to the tool bar through 1 to 2 screws. Such a design is reasonable.

Further, the tool bit is fixed to the tool bar through a screw, and an angle formed by the screw and a plane where the tool bit is located is 60° to 90°. The solution is preferred.

Preferably, the tool bit is fixed to the tool bar through a screw, and the screw is perpendicular to the plane where the tool bit is located. The solution is preferred.

Further, the main chip groove extends helically, straightly or helically at a front-end portion and straightly at a rear-end portion along the axis, and is used for removing the cutting chips.

Further, the angle of the first helical angle in the main chip groove is $\beta 1=20°$ to $30°$ and the angle of the second helical angle is $\beta 2=5°$ to $15°$. The design with different helical angles is adopted for the interior of the main chip groove, so that the problems of excessively large depth in the groove, poor chip removal effect and the like are solved, the strength of the tool bar may be effectively strengthened, and torsional deformation in the drilling process is reduced.

Further, the cooling passage is provided with a main passage in the tool bar along the axis, and an end portion, extending to be close to the central positioning hole, of the main passage is divided into two branches which extend to the cooling holes in the two cooling guide grooves respectively. The design is reasonable.

A tool bit mounting method for a tool bit replaceable rotary cutting tool is characterized in that, according to the foregoing tool bit replaceable rotary cutting tool, a central positioning cylinder of a tool bit is inserted into a central positioning hole of a tool bar, a direction of the tool bit is regulated for full contact between a convex V-shaped positioning surface and a concave V-shaped positioning surface and full contact between a contact surface and a torque support surface, and a screw is caused to penetrate through a screw hole and a tool bit screw hole for fixation. Dual positioning is implemented by combining the convex V-shaped positioning surface and the concave V-shaped positioning surface and combining the central positioning cylinder and the central positioning hole, so that the axial stress in a using process is medium, the tool bar is unlikely to damage, radial displacement of the tool bit is effectively prevented, and stable, safe and reliable machining during high-speed drilling can be ensured.

A rotary cutting method for a tool bit replaceable rotary cutting tool is characterized in that, according to the foregoing tool bit replaceable rotary cutting tool, the rotary cutting tool is started, a shank portion is held to drill a region to be drilled with a tool bit, and meanwhile, a coolant is delivered into a cooling passage; and the tool bit of the rotary cutting tool with a "V-shaped surface positioning" and "cylinder positioning" dual positioning structure straightly drills in along an axis without deviation, the coolant enters cooling guide grooves through cooling holes and is radially discharged to fully and uniformly cool the drilled region, and cutting chips enter a main chip groove and/or an auxiliary chip groove from a chisel edge avoiding surface and/or a chisel edge chip removal surface for rapid and full removal. Stability, safety and reliability in a using process are ensured.

Compared with the conventional art, the present invention has the following advantages and effects.

1: a dual positioning manner of combining the convex V-shaped positioning surface and the concave V-shaped positioning surface, and the central positioning cylinder and the central positioning hole is adopted for the tool bit and the tool bar, so that the axial stress in the drilling process may be medium, radial displacement of the tool bit can be effectively prevented, the tool bar is unlikely to damage, and stable, safe and reliable machining during high-speed drilling may be ensured.

2: due to adoption of the design with different helical angles for the interior of the main chip groove, the chip removal effect is achieved, meanwhile, the depth of the chip groove is reduced, the problems of excessively large depth in the groove, poor chip removal effect, tool bit cracking, poor drilling roughness, poor drilling accuracy and the like caused by deformation of the tool bar are solved, the strength of the tool bar may be effectively strengthened, and torsional deformation in the drilling process is reduced; and due to design of the auxiliary chip groove, the chips can be removed more smoothly, and deformation of the cutting chips is reduced to obtain optimally shaped cutting chips.

3: due to design of the two cooling guide grooves with certain lengths along the axis in the end portion of the tool bar, the discharge direction of the coolant may be accurately controlled to achieve the uniform and complete cooling effect, the cutting chips may also be flushed out, flow reduction may be avoided even though the cutting chips are drilled in, the condition that the cooling opening is blocked is avoided, and the pressure of the coolant is kept constant.

4: the tool bit is detachably connected with the tool bar, so that simplicity and convenience for mounting and dismounting are ensured, and when the service life of the tool bit is exhausted, only the tool bit is required to be replaced and the tool bar is not required to be replaced; and therefore, the cost is reduced.

Figure 1:
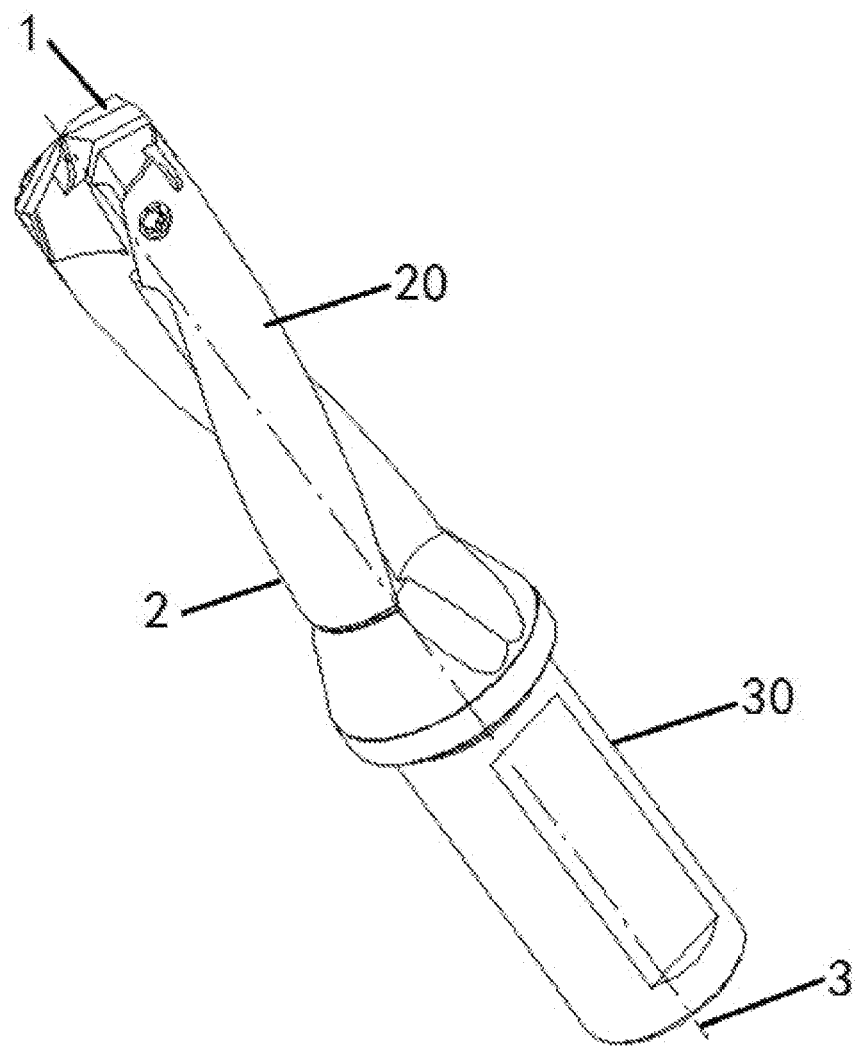
FIG. 1 is an overall structure diagram of the present invention.

Wherein: tool bit 1, tool bar 2, axis 3, cutting edge 10, tool bit screw hole 11, contact surface 12, convex V-shaped positioning surface 13, central positioning cylinder 14, chisel edge chip removal surface 15, circumferential cutting margin 16, blade portion 20, shank portion 30, torque support surface 201, concave V-shaped positioning surface 202, central positioning hole 203, screw hole 204, cooling hole 205, cooling passage 206, cooling guide groove 207, main chip groove 208, auxiliary chip groove 209, first helical angle 210, second helical angle 22, chisel edge avoiding surface 212 and screw 401.

DETAILED DESCRIPTION OF THE INVENTION

The present invention will further be described below through embodiments in combination with the accompanying drawings in detail. The following embodiments are intended to explain the present invention and the present invention is not limited to the following embodiments.

Embodiments

Figure 2:
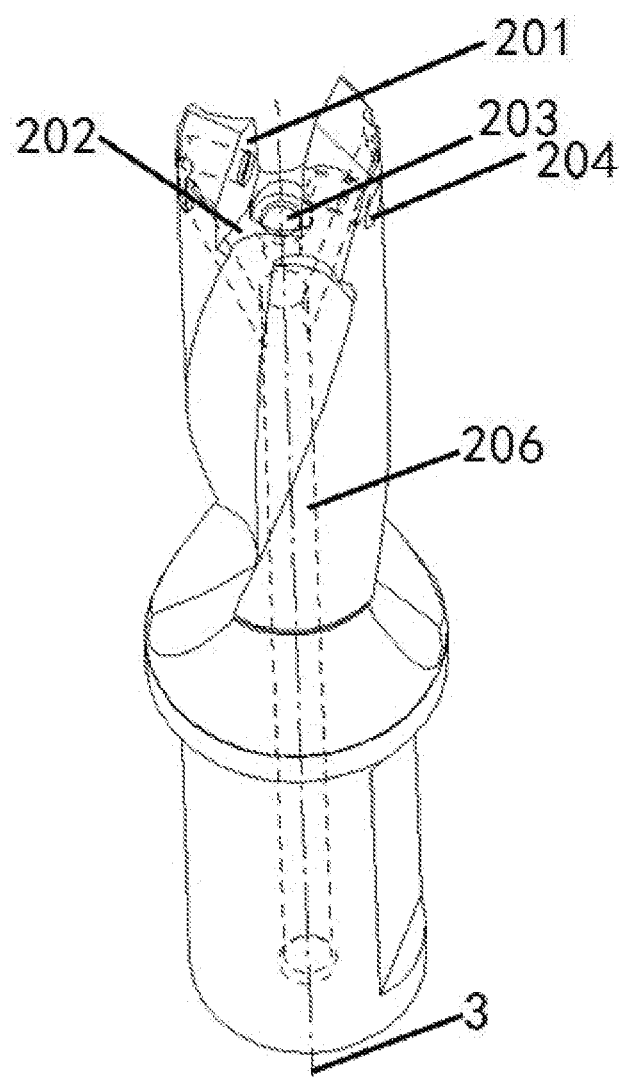
FIG. 2 is a perspective view of a tool bar according to the present invention.
Figure 3:
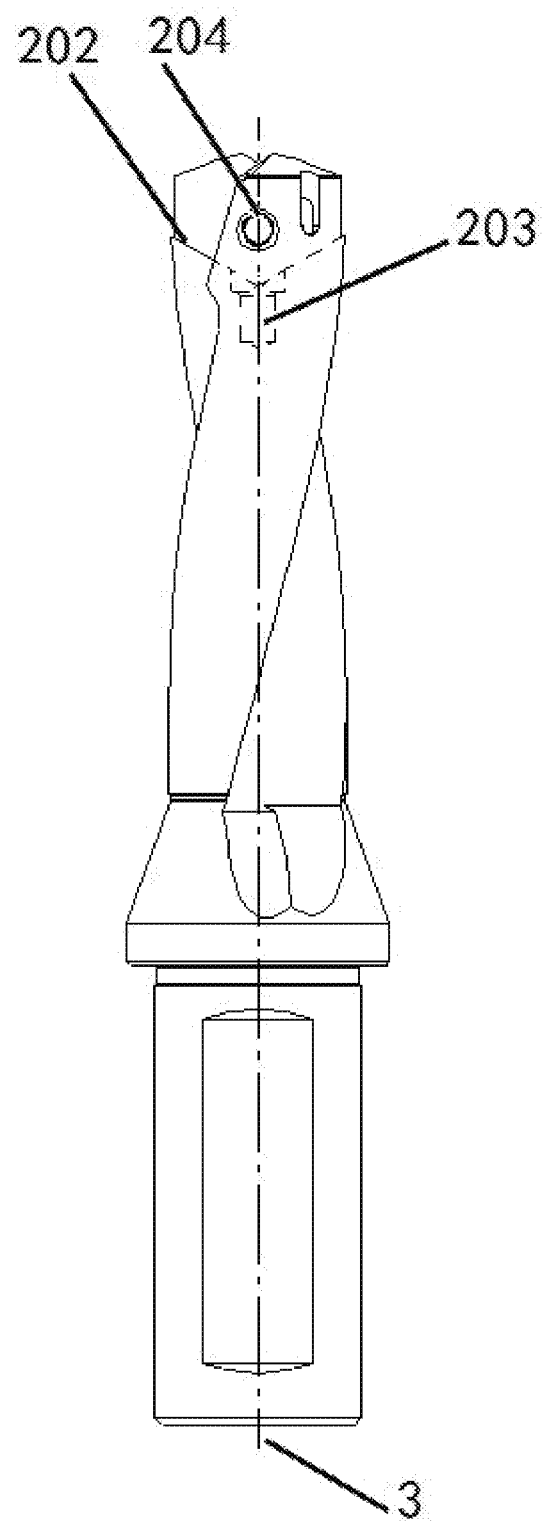
FIG. 3 is a front view of a tool bar according to the present invention.
Figure 4:
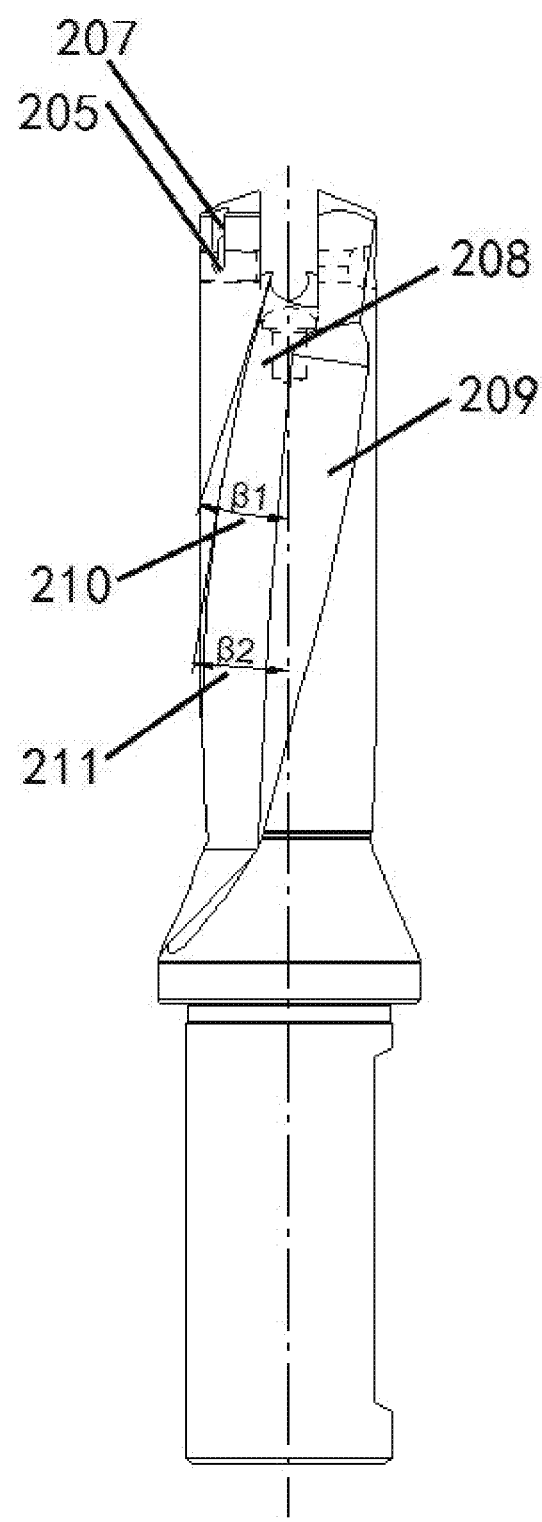
FIG. 4 is a side view of a tool bar according to the present invention.
Figure 5:
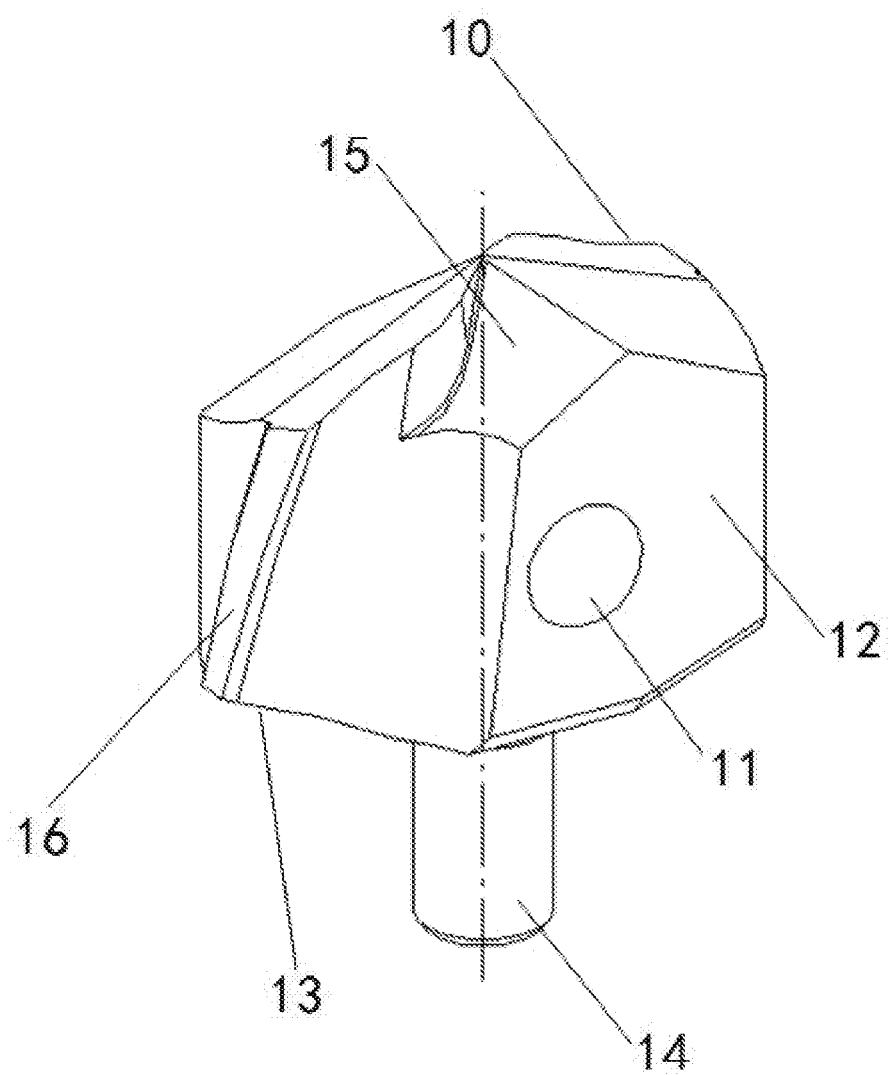
FIG. 5 is a structure diagram of a tool bit according to the present invention.
Figure 6:
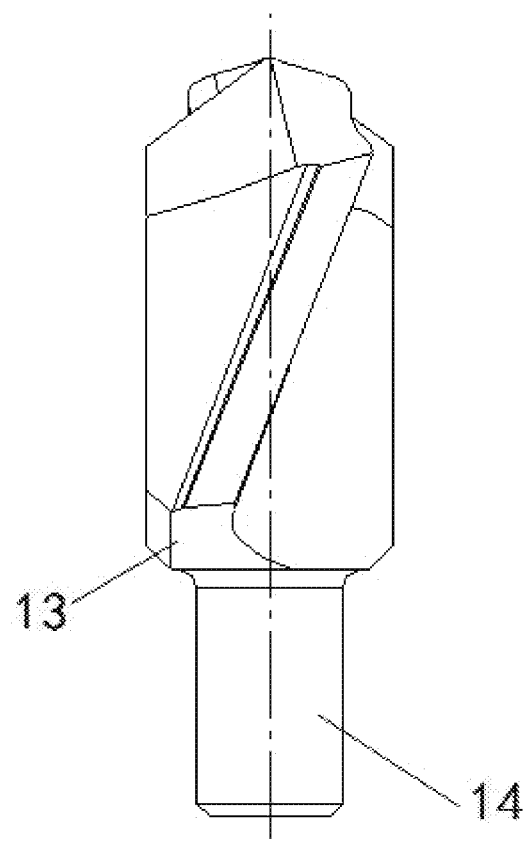
FIG. 6 is a side view of a tool bit according to the present invention.
Figure 7:
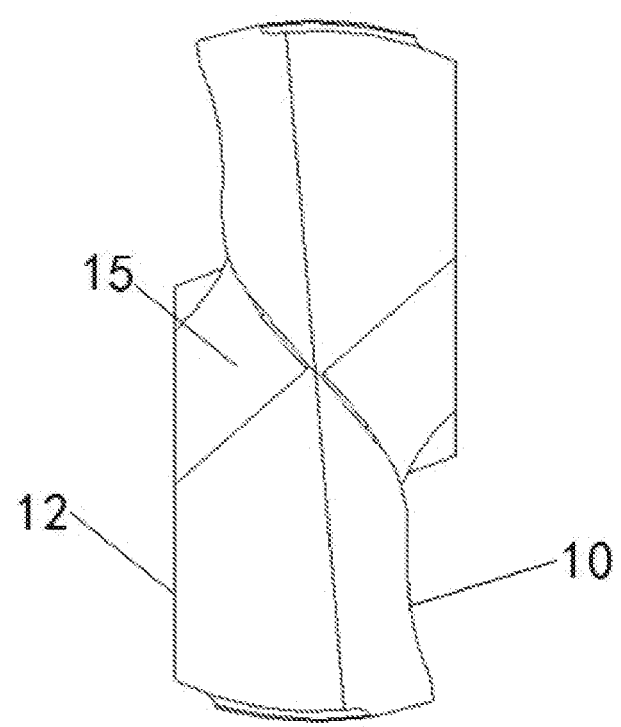
FIG. 7 is a top view of a tool bit according to the present invention.
Figure 8:
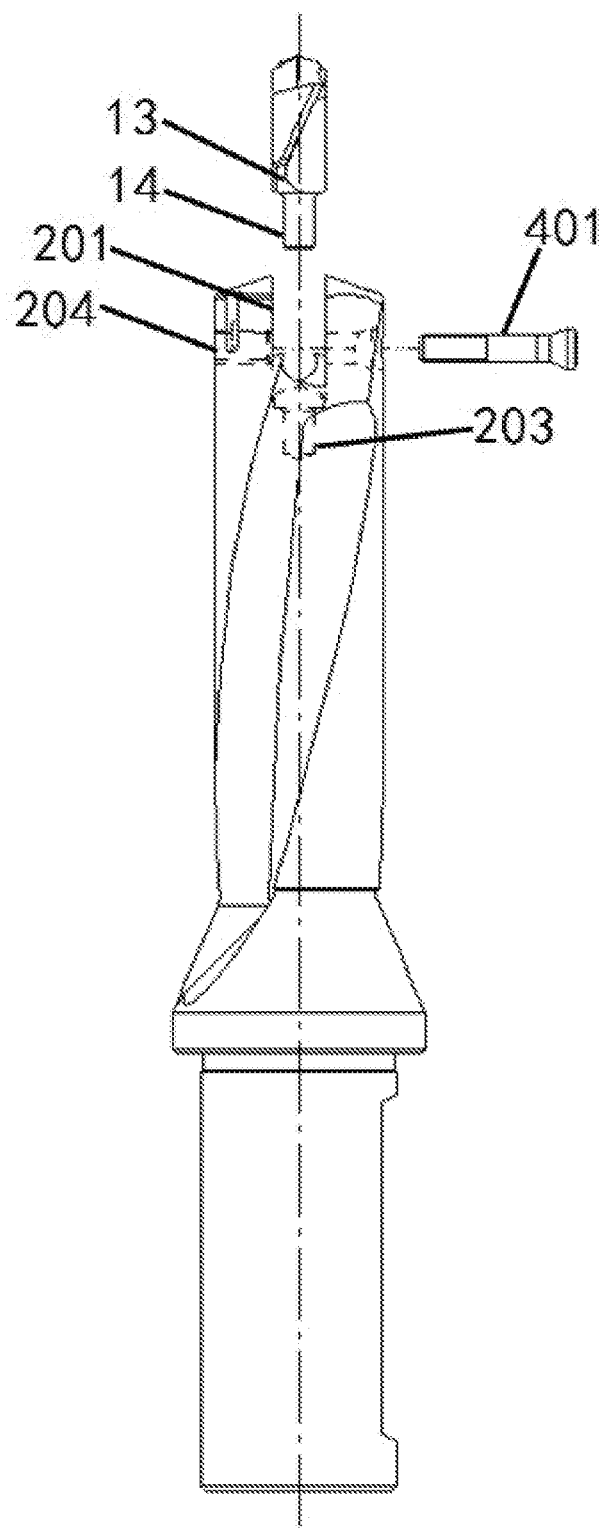
FIG. 8 is an unassembled schematic diagram of a tool bit and a tool bar according to the present invention.
Figure 9:
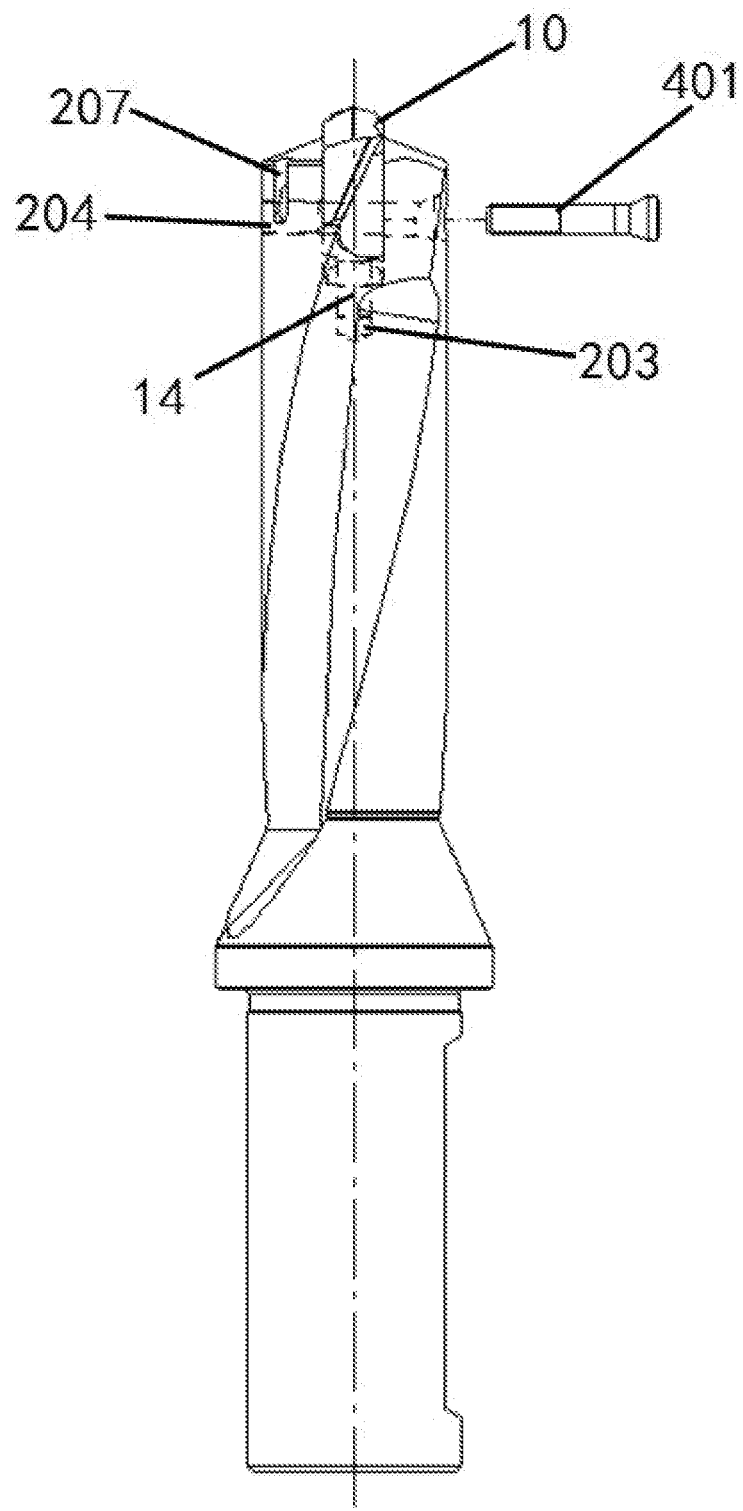
FIG. 9 is a schematic diagram of an assembling process of a tool bit and a tool bar according to the present invention.
Figure 10:
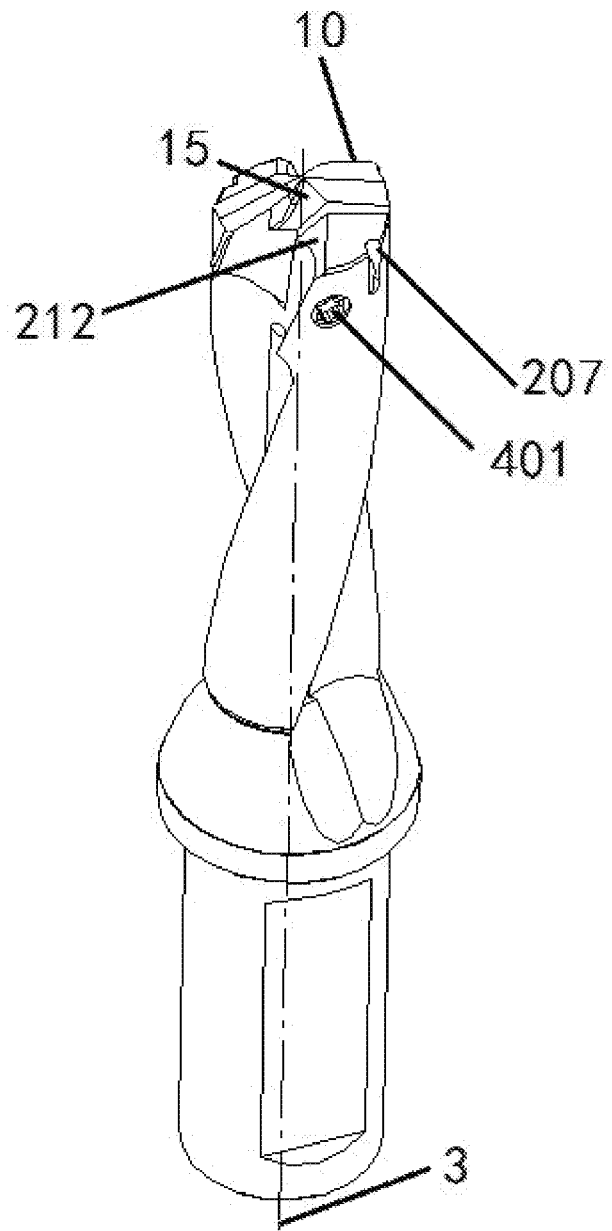
FIG. 10 is an assembled schematic diagram of a tool bit and a tool bar according to the present invention.

Referring to FIG. 1 to FIG. 10, a tool bit replaceable rotary cutting tool includes a tool bit 1 and a tool bar 2, wherein the tool bit 1 is detachably connected with the tool bar 2, the tool bit 1 and the tool bar 2 have the same axis 3, the tool bar 2 is provided with a blade portion 20 and a shank portion 30 along the axis 3, and the blade portion 20 is connected with the tool bit 1.

The tool bit 1 includes a cutting edge 10, a chisel edge chip removal surface 15, a contact surface 12, a tool bit screw hole 11, a circumferential cutting margin 16, a convex V-shaped positioning surface 13 and a central positioning cylinder 14. The tool bit 1 is of a centrosymmetric structure, the tool bit 1 may be overlapped after rotating 180° along the axis 3, the cutting edge 10 and the chisel edge chip removal surface 15 are radially arranged at the top of the tool bit 1, the contact surface 12 and the circumferential cutting margin 16 are arranged on the lateral surface of the tool bit 1 along the axis 3, the circumferential cutting margin 16 has a certain length along the axis 3, the tool bit screw hole 11 is formed in the tool bit 1 in a penetration manner and penetrates through the contact surface 12, and the convex V-shaped positioning surface 13 and the central positioning cylinder 14 are arranged at the bottom of the tool bit 1.

The tool bar 2 includes a chisel edge avoiding surface 212, a torque support surface 201, a screw hole 204, a concave V-shaped positioning surface 202, a central positioning hole 203, a cooling passage 206, cooling holes 205, cooling guide grooves 207, a main chip groove 208 and an auxiliary chip groove 209. The chisel edge avoiding surface 212 is connected with the chisel edge chip removal surface 15, the chisel edge avoiding surface 212 and the chisel edge chip removal surface 15 are converged with the main chip groove 208 and/or the auxiliary chip groove 209, the torque support surface 201 contacts with the contact surface 12, the screw hole 204 is formed in an end portion of the tool bar 2 in the penetration manner and penetrates through the torque support surface 201, the screw hole 204 and the tool bit screw hole 11 are coaxially formed, and 1 to 2 screws 401 penetrate through the screw hole 204 and the tool bit screw hole 11 to fix the tool bit 1 to the tool bar 2. In the embodiment, the tool bit 1 is fixed to the tool bar 2 through a screw 401, and an angle formed by the screw 401 and a plane where the tool bit 1 is located is 60° to 90°. Preferably, the screw 401 is perpendicular to the plane where the tool bit 1 is located.

The concave V-shaped positioning surface 202 forms positional correspondence with the convex V-shaped positioning surface 13, the central positioning hole 203 forms positional correspondence with the central positioning cylinder 14, a protruding portion of the convex V-shaped positioning surface 13 is positioned in a recess portion of the concave V-shaped positioning surface 202, the convex V-shaped positioning surface 13 contacts with the concave V-shaped positioning surface 202, a bottom included angle of the concave V-shaped positioning surface 202 is 90° to 140°, the central positioning cylinder 14 is positioned in the central positioning hole 203, a depth of the central positioning hole 203 is larger than an axial length of the central positioning cylinder 14, and a clearance with a certain length is formed between a bottom surface of the central positioning hole 203 and a bottom surface of the central positioning cylinder 14 along the axis 3.

The tool bar 2 is provided with at least one main chip groove 208 and one auxiliary chip groove 209 along the axis 3, the main chip groove 208 extends helically, straightly or helically at a front-end portion and straightly at a rear-end portion along the axis 3, an internal helical angle of the main chip groove 208 includes a first helical angle 210 and a second helical angle 211, an angle of the first helical angle 210 is different from an angle of the second helical angle 211, the angle of the first helical angle 210 is β1=20° to 30°, the angle of the second helical angle 211 is β2=5° to 15°, and the main chip groove 208 extends to the cutting edge 10 of the tool bit 1.

The cooling passage 206 for delivering a coolant during drilling is formed in the tool bar 2, two cooling guide grooves 207 distributed along a direction of the axis 3 are formed in an outer wall surface of the end portion of the tool bar 2, a cooling hole 205 is formed in one inner end of each cooling guide groove 207, the cooling passage 206 is provided with a main passage in the tool bar 2 along the axis 3, and an end portion, extending to be close to the central positioning hole 203, of the main passage is divided into two branches which extend to the cooling holes 205 in the two cooling guide grooves 207 respectively.

A tool bit mounting method for a tool bit replaceable rotary cutting tool is provided. According to the foregoing tool bit replaceable rotary cutting tool, a central positioning cylinder 14 of a tool bit 1 is inserted into a central positioning hole 203 of a tool bar 2, a direction of the tool bit 1 is regulated for full contact between a convex V-shaped positioning surface 13 and a concave V-shaped positioning surface 202 and full contact between a contact surface 12 and a torque support surface 201, and a screw 401 is caused to penetrate through a screw hole 204 and a tool bit screw hole 11 for fixation.

A rotary cutting method for a tool bit replaceable rotary cutting tool is provided. According to the foregoing tool bit replaceable rotary cutting tool, the rotary cutting tool is started, a shank portion 30 is held to drill a region to be drilled with a tool bit 1, and meanwhile, a coolant is delivered into a cooling passage 206; and the tool bit 1 of the rotary cutting tool with a "V-shaped surface positioning" and "cylinder positioning" dual positioning structure straightly drills in along an axis 3 without deviation, the coolant enters cooling guide grooves 207 through cooling holes 205 and is radially discharged to fully and uniformly cool the drilled region, and cutting chips enter a main chip groove 205 and/or an auxiliary chip groove 209 from a chisel edge avoiding surface 212 and/or a chisel edge chip removal surface 15 for rapid and full removal.

Although the present invention has been disclosed above with the embodiments, the scope of protection of the present invention is not limited thereto. Any modifications and embellishments made by those skilled in the art without departing from the concept and scope of the present invention shall fall within the scope of protection of the present invention.

The invention claimed is:

1. A tool bit replaceable rotary cutting tool, comprising a tool bit and a tool bar, the tool bit being detachably connected with the tool bar, the tool bit and the tool bar having the same axis, the tool bar being provided with a blade portion and a shank portion along the axis and the blade portion being connected with the tool bit, the tool bit comprises a cutting edge, a chisel edge chip removal surface, a contact surface, a tool bit screw hole, a circumferential cutting margin, a convex V-shaped positioning surface and a central positioning cylinder, wherein the cutting edge and the chisel edge chip removal surface are arranged at the top of the tool bit, the contact surface and the circumferential cutting margin are arranged on the lateral surface of the tool bit along the axis, the tool bit screw hole is formed in the tool bit in a penetration manner and penetrates through the contact surface, and the convex V-shaped positioning surface and the central positioning cylinder are arranged at the bottom of the tool bit; the tool bar comprises a chisel edge avoiding surface, a torque support surface, a screw hole, a concave V-shaped positioning surface, a central positioning hole, a cooling passage, a cooling hole, a cooling guide groove, a main chip groove and an auxiliary chip groove, the chisel edge avoiding surface is connected with the chisel edge chip removal surface, the chisel edge avoiding surface and the chisel edge chip removal surface are converged with the main chip groove and/or the auxiliary chip groove, the torque support surface contacts with the contact surface, the screw hole is formed in an end portion of the tool bar in the penetration manner and penetrates through the torque support surface, a screw penetrates through the screw hole and the tool bit screw hole to fix the tool bit to the tool bar, the concave V-shaped positioning surface forms positional correspondence with the convex V-shaped positioning surface, the central positioning hole forms positional correspondence with the central positioning cylinder, the convex V-shaped positioning surface contacts with the concave V-shaped positioning surface, the central positioning cylinder is positioned in the central positioning hole, and a depth of the central positioning hole is larger than an axial length of the central positioning cylinder; the tool bar is provided with the at least one main chip groove and one auxiliary chip groove along the axis, an internal helical angle of the main chip groove comprises a first helical angle and a second helical angle, an angle of the first helical angle is different from an angle of the second helical angle, and the main chip groove extends to the cutting edge of the tool bit; and the cooling passage for delivering a coolant during drilling is formed in the tool bar, two cooling guide grooves distributed along a direction of the axis are formed in an outer wall surface of the end portion of the tool bar, and a cooling hole is formed in one inner end of each cooling guide groove;
wherein the tool bit is fixed to the tool bar through the screw, and an angle formed by the screw and a plane where the tool bit is located is 60° to 90°;
wherein the angle of the first helical angle in the main chip groove is β1=20° to 30° and the angle of the second helical angle is β2=5° to 15°; and
wherein the cooling passage is provided with a main passage in the tool bar along the axis, and an end portion, extending to be close to the central positioning hole, of the main passage is divided into two branches which extend to the cooling holes in the two cooling guide grooves respectively.

2. The tool bit replaceable rotary cutting tool of claim 1, wherein a bottom included angle of the concave V-shaped positioning surface is 90° to 140°.

3. The tool bit replaceable rotary cutting tool of claim 1, wherein the screw is perpendicular to the plane where the tool bit is located.

4. The tool bit replaceable rotary cutting tool of claim 1, wherein the main chip groove extends helically, straightly or helically at a front-end portion and straightly at a rear-end portion along the axis.

5. A tool bit mounting method for the tool bit replaceable rotary cutting tool of claim 1, comprising:
 inserting the central positioning cylinder of the tool bit into the central positioning hole of the tool bar,
 regulating a direction of the tool bit for full contact between the convex V-shaped positioning surface and the concave V-shaped positioning surface and for full contact between the contact surface and the torque support surface, and
 penetrating a screw through the screw hole and the tool bit screw hole for fixation.

6. A rotary cutting method for the tool bit replaceable rotary cutting tool of claim 1, comprising:
 starting the rotary cutting tool,
 directing the shank portion to a region to be drilled with the tool bit while delivering a coolant into the cooling passage; and
 drilling the tool bit of the rotary cutting tool straightly along the axis without deviation, while the coolant enters the cooling guide grooves through the cooling holes and is radially discharged to fully and uniformly cool the drilled region, and cutting chips enter the main chip groove and/or the auxiliary chip groove from the chisel edge avoiding surface and/or the chisel edge chip removal surface for rapid and full removal.

* * * * *